W. L. CHANDLER.
CHURN FOR SEPARATING BUTTER FROM MILK AND CREAM.
APPLICATION FILED NOV. 25, 1911.
1,132,702.
Patented Mar. 23, 1915.
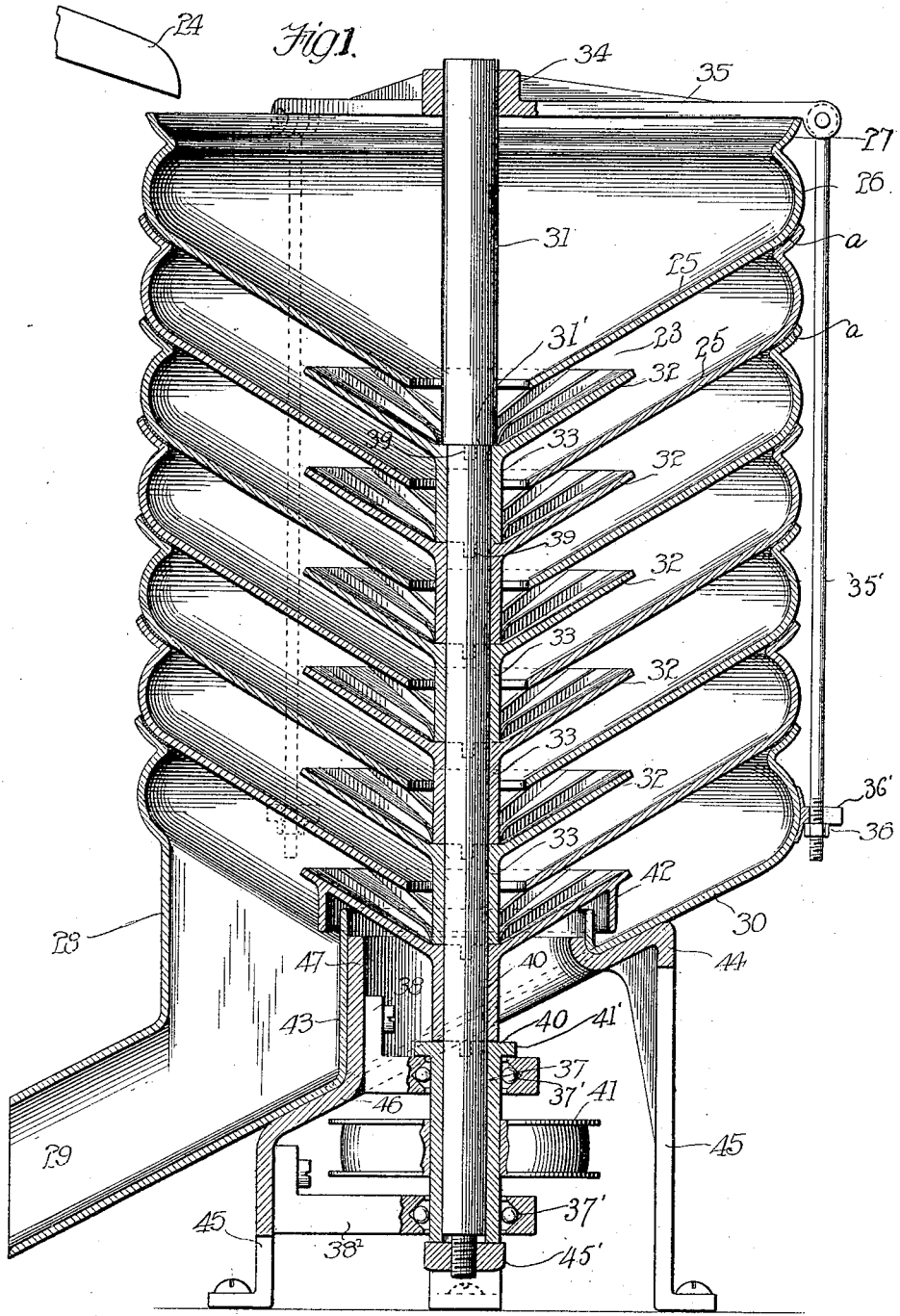
Witnesses
Martin K. Olsen
Robert Dobberman
Inventor
William L. Chandler
By Rector Hibben Davis Macauley
Attys.

UNITED STATES PATENT OFFICE.

WILLIAM L. CHANDLER, OF MISHAWAKA, INDIANA.

CHURN FOR SEPARATING BUTTER FROM MILK AND CREAM.

1,132,702.　　　　Specification of Letters Patent.　　Patented Mar. 23, 1915.

Application filed November 25, 1911.　Serial No. 662,284.

*To all whom it may concern:*

Be it known that I, WILLIAM L. CHANDLER, a citizen of the United States, residing at Mishawaka, Indiana, have invented certain new and useful Improvements in Churns for Separating Butter from Milk and Cream, of which the following is a specification.

Butter-forming fat as contained in milk and cream is composed of minute globules which by reason of their surface tension and surrounding masses or layers of casein are prevented from adhering together or agglomerating. The operation of forming butter therefrom is generally considered to consist in causing the fat globules to break through the surrounding layers of casein and to overcome their surface tension whereby they are put in condition for agglomerating with each other and may be eventually worked into a coherent mass. It is an essential condition to the formation of butter that the body of cream or milk from which it is formed be kept within certain temperature limits, which are approximately 10° and 20° C. for the upper and lower limits respectively. Below the lower limit butter does not form, above the upper limit it melts. It is desirable, therefore, in order to maintain a proper temperature to employ a churn in which but little heating of the fluid is occasioned by the working parts operating upon the liquid, and it is further desirable that the agitation of the body of the milk or cream be as slight as possible, to avoid foaming. In the churn ordinarily employed for making butter a dasher is used which agitates the fluid and, by striking the particles of fatty matter in the cream or causing them to strike the wall of the churn, frees them from the casein in which they are enveloped, overcomes their surface tension and permits the agglomeration of the particles into a mass of butter. The temperature of the cream, however, is raised thereby and much foam is formed, the operation being slow and often incomplete.

From what has been said above it is clear that it is desirable in a churn to provide as violent concussion as possible for the cream globules while at the same time avoiding so far as possible heating or agitation.

It is the object of my invention to form the butter quickly by causing all the particles of cream to undergo violent impact and to practically the same extent without subjecting the fluid to the friction and agitation referred to above, to a greater extent than necessary and thereby dispense with the objectionable heating and foaming as far as possible.

With this object in view, my invention consists in the churn illustrated in the accompanying drawings and specifically described in the following specification, although it is to be understood that my invention is not limited to the particular form shown, but may take a variety of other forms and modifications coming within the scope of the following claims.

In the accompanying drawing is shown in central vertical section a preferred form of churn embodying my invention.

By my invention all the milk or cream is rapidly submitted to impact against the walls of the vessel in a short time, and sufficiently often to rupture all the fat cells. At the same time this is accomplished without any unnecessary friction, heat or agitation of the liquid. The salient feature of this embodiment of my invention is its capacity for submitting the cream or milk to any desired number of treatments during continuous passage thereof through the apparatus and its adaptation to power operation on a large scale. The cream, coming in a continuous stream from a spout such as shown at 24, is received within the upper one of a series of superposed inverted conical disks 25 which have upturned edges, as at 26, at their peripheries, provided with outwardly extending flanges 27. Each flange 27 is so formed as to receive and fit the lower portion of the curved wall formed by the upturned edge of the superposed disk and to form a close joint therewith, such edges together constituting the outer wall of the churn. The number of the disks in the series depends upon the number of treatments to which each particle of milk or cream is to be subjected, and the series is mounted upon a collecting member 28 which supports the same and terminates in an outlet 29, toward which the floor of the collecting member is sloped to direct any and all fluid received therein to the outlet.

The conical disks are truncated in planes parallel to their bases, leaving a central aperture in each, and through this aperture extends a rotary shaft 31 upon which is mounted a series of disks 32, preferably outwardly flaring, corresponding in number to the stationary disks 25, each rotary disk occupying a position about midway between adjacent stationary disks. The rotary disks are preferably radially ribbed as at 23 and provided with collars 33 which surround the shaft *seriatim* and serve to space the rotary disks and to give them the proper location with reference to the stationary disks, each collar being formed with a notch in its upper edge and with a lug or projection 39 on its lower edge whereby the disks are interlocked for joint rotation with the shaft. The latter is carried in upper and lower bearings the upper bearing consisting of a hub or collar 34 which forms the center of a spider having the legs or members 35 which extend beyond the periphery of the upper disk and rest thereon. To the outer end of each member of the spider is pivoted a bolt rod 35' which when the churn is in assembled position extends downward alongside the wall formed by the upturned edges of the disks and into a slotted ear 36' on the collecting member. By adjusting the nuts 36 upon the rods the series of stationary disks will be firmly held in position and it is to be noted that preferably the disks are packed along their meeting surfaces by rubber washers *a* which secure tight joints and prevent leaking. At its lower end the rotary shaft is supported in bearings 38, 38' which are attached to the casting 44 which forms the support for the churn. Said casting comprises a plate 46 sloped to correspond to the slope of the bottom wall of the collector supporting legs 45 to one of which the bracket 38' above referred to is secured, and an upwardly extending annulus or circular flange 47 extending within the flange 43 of the collecting member. The brackets 38 and 38' are bored and chambered to receive a collar 40' and the balls 37'. Upon its upper end the collar is provided with an outwardly projecting flange 41' which rests upon the upper bearing block or bracket and the collar and rotary disks are clamped between a shoulder 31' upon the shaft and nut 45' which is screwed upon the lower end of the shaft. Intermediate the brackets 38 and 38' a pulley 41 is secured upon the sleeve for driving the shaft.

The operation of the churn will be apparent. The cream fed in through the spout 24 falls upon the first stationary concave disk 25 and is fed from the center thereof to the first rotating disk. From the edge of the first of the rotating disks it is driven with great velocity by centrifugal force against the curved portion of the next stationary disk, down which it flows to the conical portion and through the central opening thereof to the next rotary disk beneath, this operation being repeated through the entire series of disks until the collector is reached, down the floor of which the cream flows with the butter contained therein, to the outlet 29. The cream or milk with the contained butter may be transferred from the churn to a suitable gathering means by which the butter particles are caused to agglomerate. The milk and butter is then submitted to the usual further treatment. By constructing the churn in the manner shown and described, with no permanent connection between the several rotary and fixed disks, it is possible to clean the device where necessary by removing the nut at the bottom of the shaft, withdrawing the shaft and loosening the nuts 36 whereupon the rods 35' may be swung outward and the series of disks may be removed separately and washed or otherwise treated. By reason, however, of the construction of my device and the smooth surface presented to the milk or cream, there is little opportunity for the collection of objectionable matter, and the device may be readily cleaned by running a generous supply of water or other cleaning fluid therethrough. In this construction every particle of the milk is subjected to a series of impacts corresponding to the entire number of rotary disks, and by employing a suitable number of the latter the separation of butter may be made absolutely complete.

I claim:

1. In a churn, the combination with a receptacle or container, of a rotary disk presenting an uninterrupted passage from a point near its center to its periphery and adapted to receive cream at a point remote from its periphery and discharge it forcibly against the wall of the churn by centrifugal force, and means to feed milk to said disk from above.

2. In a churn, the combination with a receptacle or container, of a rotary disk having a radially uninterrupted upper surface adapted to receive cream and discharge it against the inner wall of said container, and means for feeding cream to said disk from above.

3. In a churn, the combination with a receptacle, of a rotary disk therein having smooth passages extending from the central portion to the periphery thereof, of a container in which said disk is mounted having walls arranged substantially transversely of the stream of milk discharged from said disk, and means for supplying milk to the disk near the center thereof.

4. In a churn, a rotary disk, means for feeding liquid near the center thereof, a disk having an upturned concave wall or rim surrounding said rotary disk and adapted to receive the impact of liquid thrown by centrifugal force by the rotary disk.

5. In a churn, a rotary disk, means for rotating the same, means for feeding liquid to the center thereof, an impact disk having a concave wall or rim surrounding said rotary disk said impact disk having an outlet at its lowest point and the wall or rim of said stationary disk adapted to receive the impact of liquid discharged from the rotary disk.

6. In a churn, a series of rotary disks, a series of impact disks having concave edges surrounding the rotary disks and spaced from the edges thereof said impact disks having outlet openings and means for feeding liquid to the upper disk of the series whereby milk may be fed continuously through the churn and acted upon by each rotary disk in turn.

7. A churn comprising a rotary spindle, a series of disks mounted thereon and spaced apart, a series of intermediate impact disks having upturned concave edges surrounding the rotary disks forming the exterior wall of the churn and openings through which the spindle extends and forming passages for the cream.

8. A churn comprising a rotary spindle, a series of downwardly concave disks mounted and spaced apart, a series of intermediate stationary downwardly concave disks having upturned edges forming the exterior wall of the churn and openings through which the spindle extends and forming passages for the cream, and a collector with which the lowermost stationary disk communicates and which has an outlet 29, and an opening through the bottom of the collector having upwardly turned edges the lowermost disk being provided with a depending apron surrounding said upturned edges.

WILLIAM L. CHANDLER.

Witnesses:
AVERY C. SHROTH,
KARL W. KNORR.

Copies of this patent may be obtained for five cents each, by addressing the "Commissioner of Patents, Washington, D. C."